United States Patent [19]

Teranishi

[11] Patent Number: 4,844,679
[45] Date of Patent: Jul. 4, 1989

[54] DISK FILE APPARATUS

[75] Inventor: Shunichi Teranishi, Anjo, Japan

[73] Assignee: Aisin Seiki Kabushiki Kaisha, Japan

[21] Appl. No.: 112,173

[22] Filed: Oct. 26, 1987

[30] Foreign Application Priority Data

Oct. 24, 1986 [JP] Japan .............................. 61-254354

[51] Int. Cl.$^4$ .............................................. B65G 1/10
[52] U.S. Cl. ................................ 414/331; 360/98.01;
369/195; 369/192; 414/783; 414/281; 414/416;
414/280; 414/661; 414/273; 414/618; 414/753;
414/730
[58] Field of Search ................... 360/98; 414/331, 266,
414/267, 268, 273, 274, 275, 277, 280, 281, 282,
283, 286, 222, 225, 226, 620, 618, 753, 751, 661,
660, 659, 783, 754, 416, 730, 732; 369/194, 34,
192, 191, 177, 178, 195

[56] References Cited

U.S. PATENT DOCUMENTS

| 3,503,527 | 3/1970 | Devol ............................ 414/783 X |
| 4,173,427 | 11/1979 | Beuch et al. .................... 414/416 X |
| 4,614,474 | 9/1986 | Sudo .................................. 414/281 |

FOREIGN PATENT DOCUMENTS

| 163463 | 12/1985 | European Pat. Off. ............ 369/192 |
| 118602 | 7/1984 | Japan ................................ 414/280 |
| 1172840 | 8/1985 | U.S.S.R. ............................ 414/331 |

Primary Examiner—Frank E. Werner
Attorney, Agent, or Firm—Sughrue, Mion, Zinn, Macpeak & Seas

[57] ABSTRACT

A disk file apparatus including a transfer member disposed at the upper side of a shelf for accommodating a multiplicity of cartridges each receiving a disk both sides of which are able to be subjected to recording and reproducing, each cartridge having a forward extending groove formed in the rear portion thereof. The transfer member has lever means which is arranged such that, when a cartridge having the same rating as that of said cartridges is inserted into the transfer member, the lever means detects whether or not there is a groove which is formed in the rear portion of the cartridge. The apparatus further includes a controller which is arranged such that, when the lever means detects the groove formed in the rear portion of the cartridge inserted in the transfer member, the controller activates a carrier to turn the cartridge through 180 degrees while the cartridge is being moved from the transfer member to an empty accommodating space in the accommodating shelf, and when the downward side of the disk received in the selected cartridge is not coincident with the side which is to be subjected to writing or reading of information in the coder, the controller activates the carrier to turn the selected cartridge through 180 degrees before it is loaded into the coder. Accordingly, all the cartridges accommodated in the accommodating spaces have the disks facing downward. Thus, the judgement as to which side of the disk in a selected cartridge faces downward need not be made between the selection of the cartridge and the loading of the selected cartridge into the coder, and therefore it is possible to shorten the access time.

2 Claims, 12 Drawing Sheets

DISK FILE APPARATUS

BACKGROUND OF THE INVENTION

1. Field of the Invention

The present invention relates to a disk file apparatus.

2. Description of the Related Art

In a typical conventional disk file apparatus, a multiplicity of cartridges are accommodated in an accommodating shelf, each cartridge receiving a disk both sides of which are able to be subjected to recording an reproducing, and a selected one of the cartridges is loaded into a coder by means of a carrier, thereby subjecting the downward side of the disk to recording or reproducing.

In the above-described prior art, a judgement as to whether the downward side of the disk is the side A or B is made in such manner that a reflecting marker is attached to one end face of each cartridge, while a pair of reflection type sensors are provided on the carrier, and a judgement is made as to whether the downward side of the disk is the side A or B on the basis of which one of the sensors has detected the reflecting marker. If it is found that the designated side does not face downward, the carrier turns the cartridge through 180 degrees and then loads it into the coder.

The prior art suffers, however, from the problem that, since the judgement as to which side of the disk accommodated in a selected cartridge faces downward is made between the selection of a cartridge and the loading of the selected cartridge into the coder, the access time is increased correspondingly.

SUMMARY OF THE INVENTION

Accordingly, it is a primary object of the present invention to provide a disk file apparatus wherein the cartridges are accommodated inside the accommodating shelf in such a manner that the sides A of all the disks face downward.

To this end, the present invention provides a disk file apparatus which comprises the following constituent elements (1) to (6):

(1) an accommodating shelf having a multiplicity of accommodating spaces provided therein in a row in the vertical direction;

(2) a multiplicity of cartridges disposed in the accommodating spaces, respectively, each having a disk received therein and further having a forward extending groove formed in the rear portion thereof;

(3) a coder which writes or reads information in relation to either the side A or B of the disk received in each of the cartridges;

(4) a transfer member disposed at the upper side of the accommodating shelf, the transfer member having lever means which is arranged such that, when a cartridge having the same rating as that of said cartridges is inserted into the transfer member, the lever means detects whether or not there is a groove which is formed in the rear portion of the cartridge;

(5) a carrier arranged such as to move vertically along the respective front surfaces of the transfer member and the accommodating shelf, draw out a cartridge from the transfer member, insert the cartridge into an empty accommodating space in the accommodating shelf, draw out a designated one from the multiplicity of cartridges accommodated in the accommodating shelf, and load the cartridge into the coder; and (6) a controller arranged such that, when the lever means detects the groove formed in the rear portion of the cartridge inserted in the transfer member, the controller activates the carrier to turn the cartridge through 180 degrees while the cartridge is being moved from the transfer member to an empty accommodating space in the accommodating shelf, and when the downward side of the disk received in the selected cartridge is not coincident with the side which is to be subjected to writing or reading of information in the coder, the controller activates the carrier to turn the selected cartridge through 180 degrees before it is loaded into the coder.

By virtue of the above-described arrangement, when a new cartridge is inserted into the transfer member, whether the downward side of the disk is the A or B is judged by the lever means, and if the side B faces downward, the carrier turns the cartridge concerned through 180 degrees before it is inserted into an empty accommodating space in the accommodating shelf. Accordingly, all the cartridges accommodated in the accommodating spaces have the disks facing downward at their sides A. Thus, the judgement as to which side of the disk in a selected cartridge faces downward need not be made between the selection of the cartridge and the loading of the selected cartridge into the coder, and therefore it is possible to shorten the access time.

The above and other objects, features and advantages of the present invention will become apparent from the following description of the preferred embodiment thereof taken in conjunction with the accompanying drawings.

DESCRIPTION OF THE PREFERRED EMBODIMENT

Figure 1:
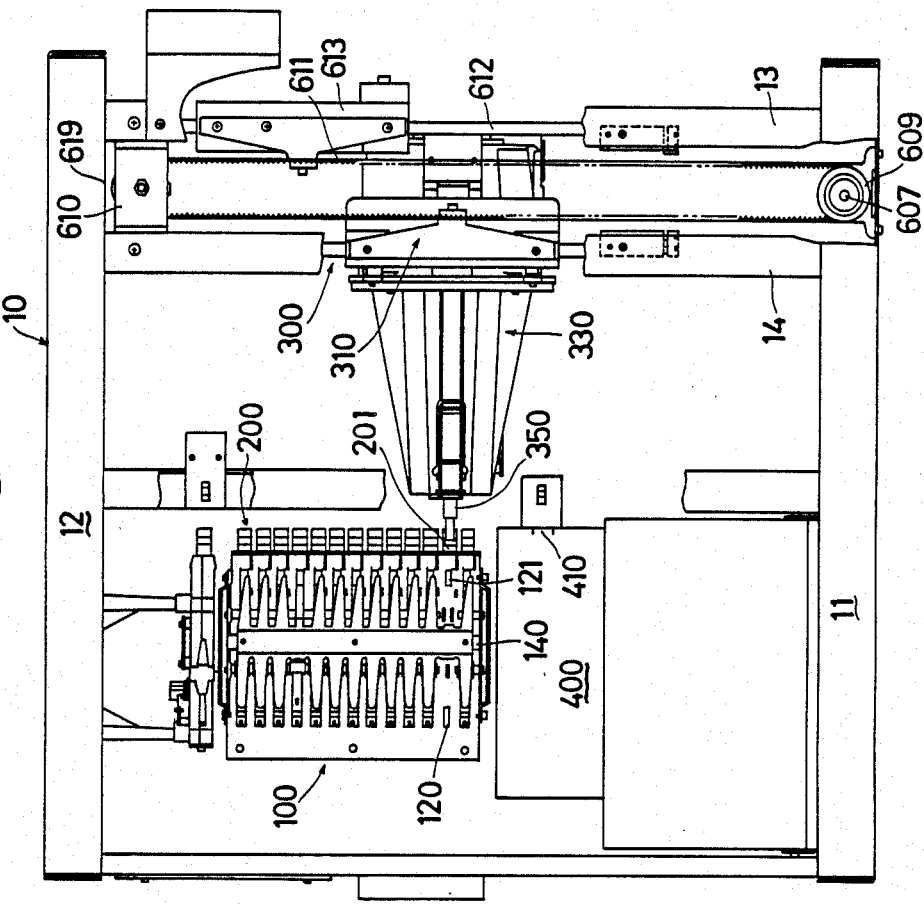
FIG. 1 is a side view of one embodiment of the disk file apparatus according to the present invention as viewed from one side thereof.

One embodiment of the present invention will be described hereinunder in detail with reference to the accompanying drawings.

The outline of the disk file apparatus 10 will first be explained with reference to FIG. 1. A total of thirteen thin cartridges 200 are accommodated inside an accommodating shelf 100 in such a manner that the cartridges 200 are vertically spaced apart from each other, and a disk (not shown) both sides (the side A and the side B) of which are able to be subjected to recording and reproducing is accommodated inside each cartridge 200. When it is instructed to record (reproduce) information on (from) the side A (or B) of a particular cartridge 200, a carrier 300 which is vertically movable is moved so as to face said cartridge 200, and a retainer portion 350 of the carrier 300 draws the cartridge 200 into a base portion 330. Then, the carrier 300 is lowered, and when the carrier 300 faces an insertion port 410 of a coder 400, the retainer portion 350 of the carrier 300 is pushed out from the base portion 330 so that the cartridge 200 is loaded into the coder 400 through the insertion port 410. After the cartridge 200 has been loaded, the retainer portion 350 of the carrier 300 is maintained in this position, and the downward side of the disk loaded in the cartridge 200 is subjected to writing or reading of information within the coder 400. After the completion of writing or reading in relation to the disk, the cartridge 200 is unloaded from the coder 400 so as to be drawn into the base portion 330. It should be noted that each cartridge 200 is disposed in the accommodating shelf 100 in such a manner that the side A of the disk accommodated therein faces downward; therefore, when it is instructed to write or read information in relation to the side B of the disk, the base portion 300 rotates through 180 degrees relative to a carrier body portion 310 at a predetermined position in the course of the downward travel of the carrier 300, thus enabling the side B of the disk to face downward before the cartridge 200 is loaded into the coder 400.

Figure 2:
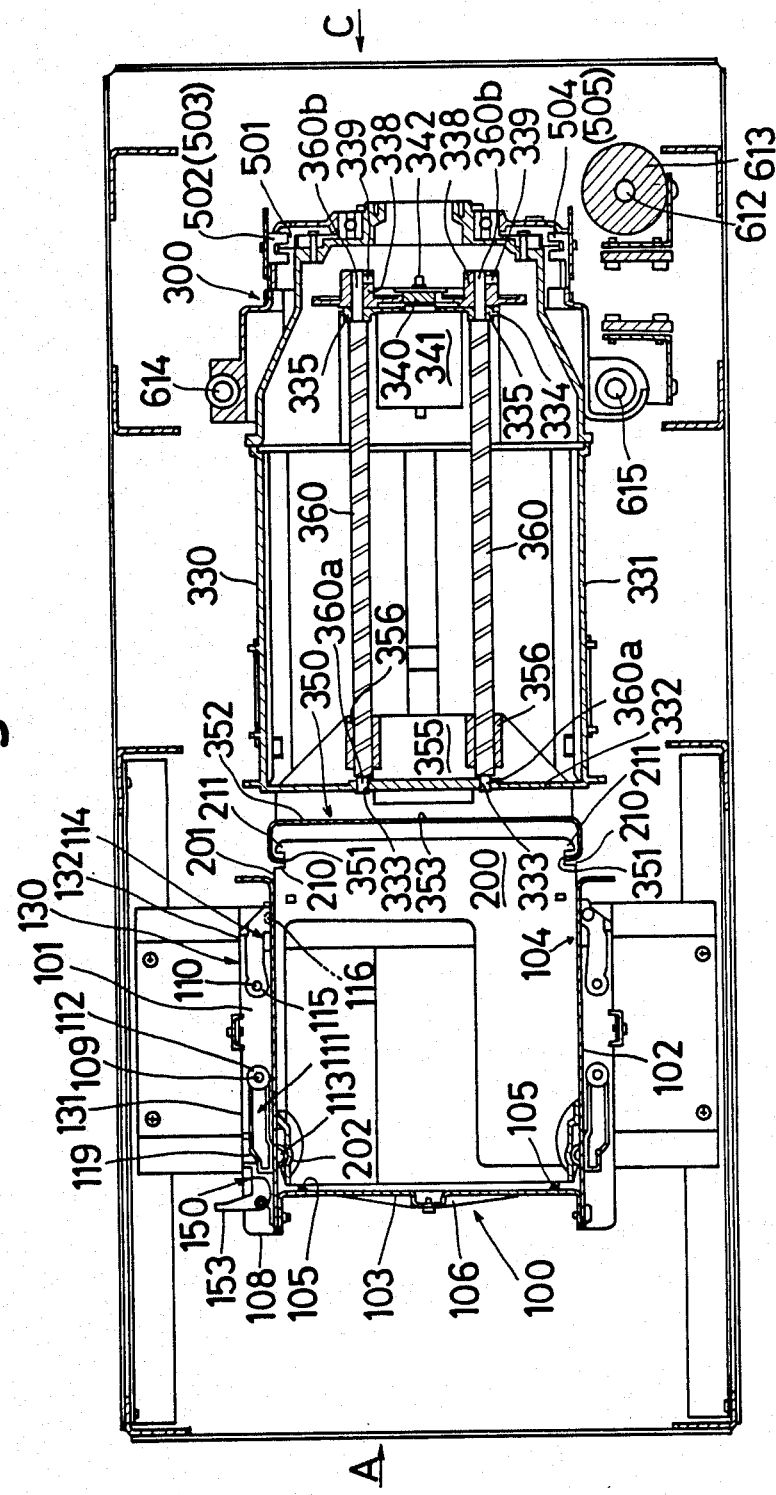
FIG. 2 is a horizontal sectional view of the embodiment, which shows the interior thereof.
Figure 3:
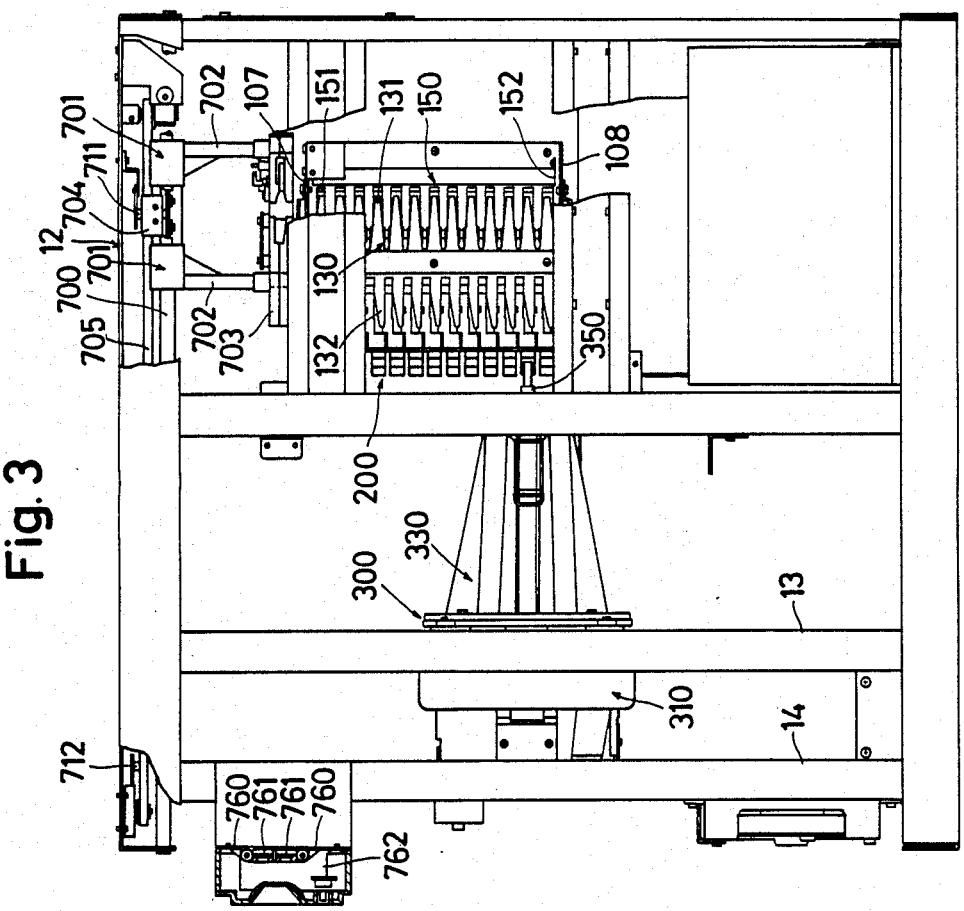
FIG. 3 is a side view of the embodiment as viewed from the other side thereof.

As shown in FIGS. 1 to 3, the accommodating shelf 100 is composed of side plates 101 and 102 which face each other, and a rear plate 103 which connects together the respective rear end portions of the side plates 101 and 102. The inside of the accommodating shelf 100 is divided by partition plates (not shown) into thirteen accommodating spaces 104 which are vertically separated from each other, and a cartridge 200 is inserted into each accommdoating space 104 in such a manner that the side A of the disk accommodated therein faces downward. In order to prevent over-insertion of the cartridges 200, a pair of projections 105 are provided on a leaf spring 106 which is secured to the outer side of the central portion of the rear plate 103 and the projections 105 are projected inside each accommodating space 104 so as to serve as stoppers. Flange portions 107 and 108 which project outward are formed at the upper and lower ends, respectively, of the side plate 101, and the respective upper end portions of shafts 109 and 110 are secured to the flange portion 107, while the respective lower end portions of the shafts 109 and 110 are secured to the flange portion 108. The proximal end portion 112 of an engagement member 111 is fitted on the shaft 109 in such a manner that the engagement member 111 is able to pivot but unable to move vertically. A projection 113 which is formed at the distal end of the engagement member 111 passes through a window 120 formed in the side plate 101 and engages with a recess 202 which is formed in the rear portion of the side surface 201 of the cartridge 200 accommodated in each accommodating space 104. The proximal end portion 115 of an oscillating member 114 is fitted on the shaft 110 in such a manner that the shaft 110 is able to pivot but unable to move vertically, while the distal end portion of the oscillating member 114 carries a roller 116 in such a manner that the roller 116 is rollable. The distal end portion of the oscillating member 114 passes through a window 121 which is formed in the side plate 101 and comes into contact with the front portion of the side surface 201 of the cartridge 200 within the accommodating space 104. Both the engagement and oscillating members 111 and 114 are constantly biased toward the side surface 201 of the cartridge 200 by the resilient force from two end portions 131 and 132, respectively, of a leaf spring 130, thus enabling the projection 113 at the distal end of the engagement member 111 to engage with the recess 202 formed in the cartridge 200 and also enabling the roller 116 retained by the oscillating member 114 to come into contact with the front portion of the side surface 201 of the cartridge 200. The leaf spring 130 is secured to a pole 140 which is secured to the flange portions 107 and 108 so as to extend therebetween. It should be noted that the side plate 102 and its associated members are arranged in the same way as the above.

Figure 4:
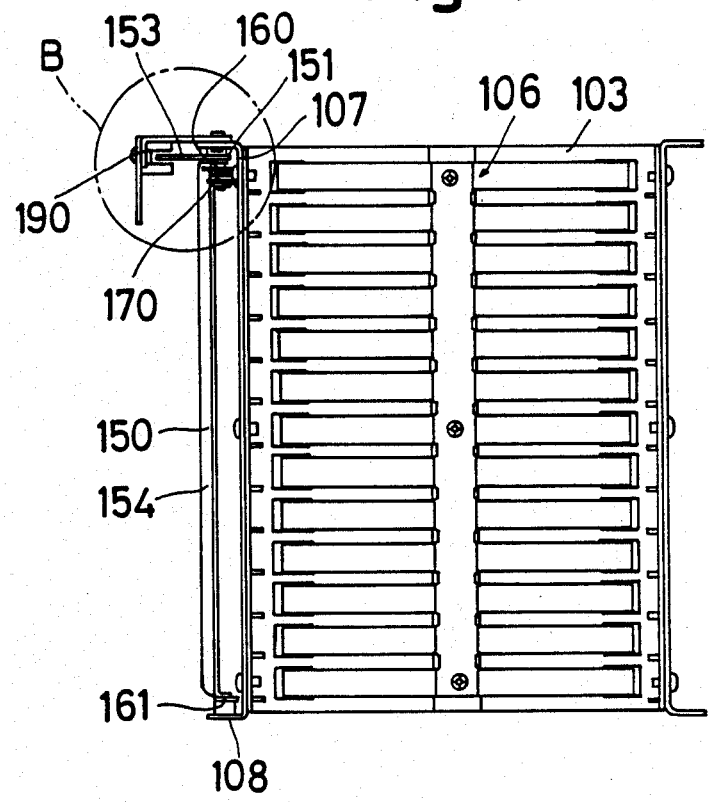
FIG. 4 shows the embodiment as viewed in the direction of the arrow A in FIG. 2.
Figure 5:
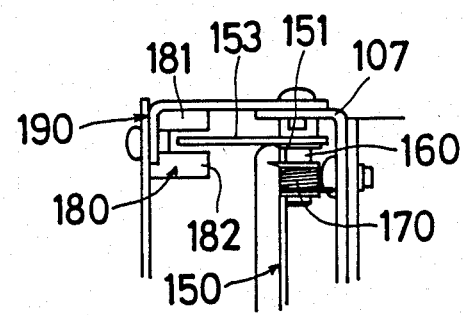
FIG. 5 is an enlarged view of the portion B shown in FIG. 4.

As shown in FIGS. 3 to 5, the upper and lower end portions of a lever 150 are pivotally supported by the flange portions 107 and 108 through pins 160 and 161, respectively, at a position to the side of the rear end portion of the side plate 101. A tongue portion 153 projects outward from the upper end portion 151 of the lever 150. The longitudinal (vertical) surface 154 of the lever 150 is engaged with the outer surfaces 119 of the distal end portions of all the engagement members 111 by the action of a coil spring 170. Thus, the tongue portion 153 is pivoted in response to the pivotal motion of each engagement member 111 about the shaft 109 which is caused by the insertion or removal of the cartridge 200, and every time the tongue portion 153 pivots, it intercepts the rays of light emitted from a light-emitting portion 181 of a photosensor 180 to a light-receiving portion 182 thereof. This interception of light is delivered to a controller (not shown) in the form of a signal representative of the fact that there is no abnormality in insertion or removal of the cartridge 200. It should be noted that the photosensor 180 is secured to a bracket 190 which is connected to the flange portion 107.

Figure 6:
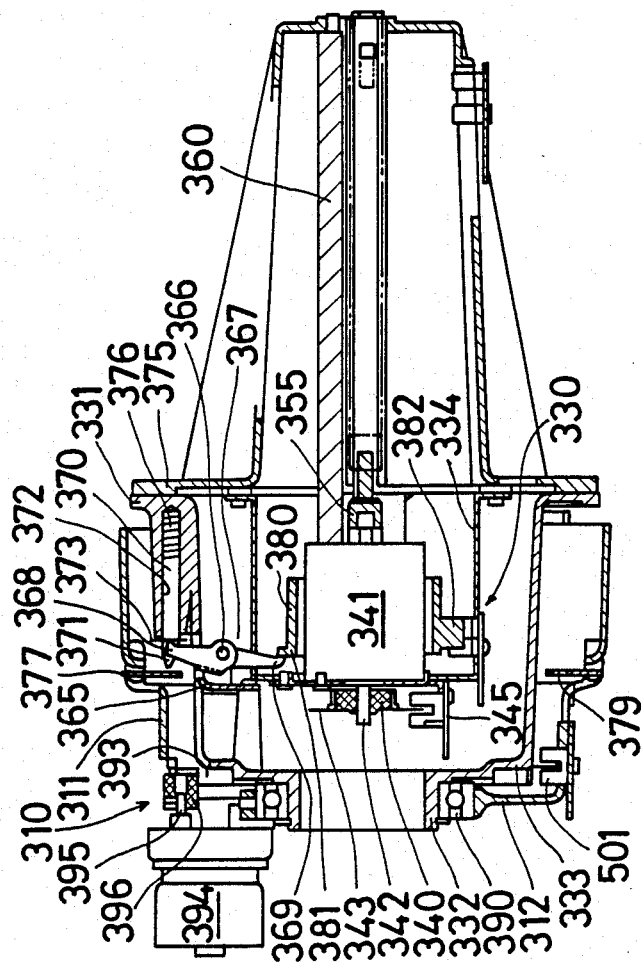
FIG. 6 is a sectional view of a carrier employed in the embodiment.

As will be particularly clear from FIG. 2, vertical grooves 210 are cut in both sides, respectively, of the forward end portion of the cartridge 200, and lateral projections 211 are formed forwardly of the grooves 210, respectively. The grooves 210 and the lateral projections 211 of the cartridge 200 are formed in the portion thereof which projects forwardly from the forward ends of the side plates 101 and 102 by a predetermined distance, the grooves 210 being vertically coincident with each other. Engagement portions 351 are provided on the retainer portion 350 of the carrier 300 in such a manner that the engagement portions 351 are able to fit loosely into the grooves 210, respectively, in any one of the cartridges 200 in response to the vertical movement of the carrier 300. Thus, when the retainer portion 350 of the carrier 300 is drawn into the base portion 330, the engagement portions 351 engage with the lateral projections 211 of the cartridge 200, thereby enabling the cartridge 200 to be received within the base portion 330 of the carrier 300. As shown in FIGS. 2 and 6, the engagement portions 351 are formed by bending both end portions of a metal plate 352. The central portion 353 of the metal plate 352 is secured to the front surface of a moving member 355. The moving member 355 has boss portions 356 formed integral with the upper surface thereof, the boss portions 356 being fitted on screw shafts 360, respectively. One end portion 360a of each of the screw shafts 360 is rotatably supported by a hole 333 which is formed in a front plate 332 of a casing 331 of the carrier base portion 330, while the other end portion 360b of each screw shaft 360 is rotatably supported by a bearing 335 which is secured to a bracket 334. Gears 338 are secured to the end portions 360b of the screw shafts 360 by means of screws 339, respectively, and a gear 340 is disposed between the gears 338 in such a manner as to mesh with both of them, the gear 340 being secured to a shaft 342 of a motor 341 in one unit. Thus, when the motor 341 is energized, the shaft 342 is rotated, and the rotation of the shaft 342 is transmitted to the screw shafts 360 through the gear 340 and the gears 338. In consequence, the retainer portion 350 of the carrier 300 which is composed of the moving member 355 and the metal plate 352 having the engagement portions 351 defined by the bent end portions thereof is projected from or withdrawn into the base portion 330 in accordance with the direction of rotation of the screw shafts 360. It should be noted that the direction of movement of the moving member 355 can be changed by switching over the polarities of current supplied to the motor 341 from one to the other, and the amount of movement of the moving member 355 is limited in such a manner that the controller is made to suspend the supply of current to the motor 341 when a photosensor 345 has counted a predetermined number of radial grooves (not shown) formed in a plate 343 which rotates together with the shaft 342 of the motor 341 in one unit.

Figure 7:
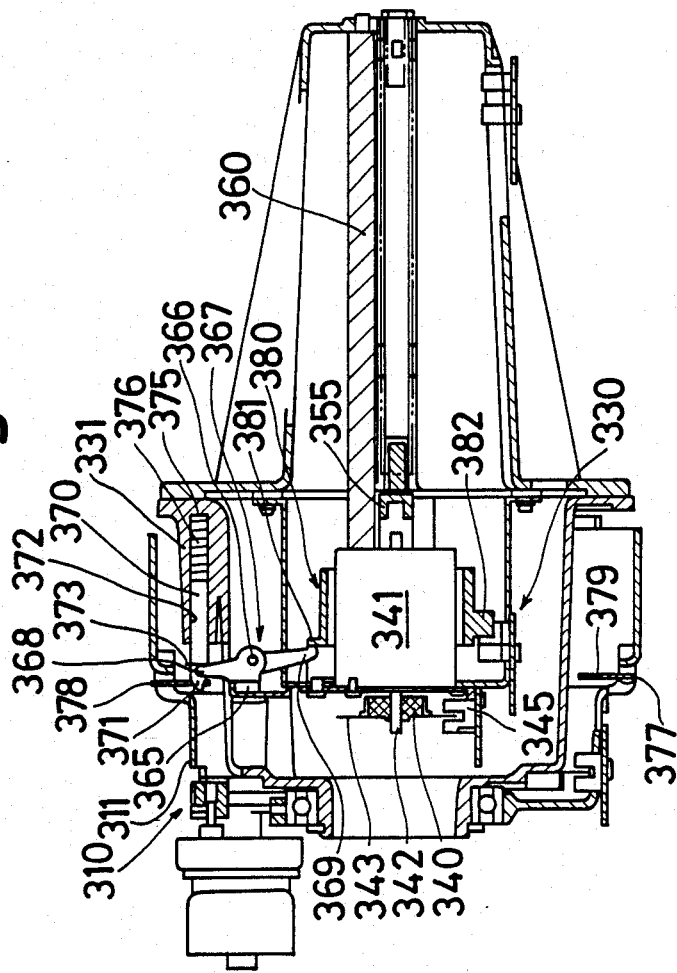
FIG. 7 is a sectional view of the carrier, showing the operation thereof.

As shown in FIG. 6, the moving member 355 is formed integral with a cylindrical member 380 which surrounds the motor 341, the cylindrical member 380 having upper and lower projections 381 and 382. A lever 367 is pivotally supported through a pin 366 in a bracket 365 which is integral with the casing 331 of the base portion 330 of the carrier 300. The upper end portion 368 of the lever 367 is engaged with a projection 373 which is integral with a pin 370, while the lower end portion 369 of the lever 367 is engaged with the upper projection 381 of the cylindrical member 380. The pin 370 is received in a blind bore 372 formed in the casing 331 of the base portion 330 of the carrier 300 in such a manner that the pin 370 is able to be projected from and withdrawn into the blind bore 372, and a spring 375 is disposed between the proximal end of the pin 370 and the bottom 375 of the bore 372. Thus, when the retainer portion 350 is completely received within the base portion 330 as shown in FIG. 6, the upper end portion 368 of the lever 367 biases the pin 370 rightward against the spring 376 through the projection 373, thereby preventing the distal end portion 371 of the pin 370 from fitting into a hole 378 formed in an annular plate 377 which is connected to the casing 311 of the carrier body portion 310 in one unit. When a short time has elapsed after the moving member 355 of the retainer portion 350 has moved rightward in order to load the cartridge 200 into the coder 400, the pin 370 is moved leftward by means of the resilient force from the spring 376, resulting in the distal end portion 371 of the pin 370 fitting into the hole 378 to thereby prevent the base portion 330 from rotating relative to the body portion 310 as shown in FIG. 7 (it should be noted that, when the base portion 330 has already rotated 180 degrees relative to the body portion 310 before the rightward movement of the moving member 355 of the retainer portion 350, the distal end portion 371 of the pin 370 fits into a hole 379 which is formed in the annular plate 377 and which is 180 degrees out of phase with the hole 378). Thus, it is possible to prevent oscillation or other undesirable movement of the base portion 330 relative to the body portion 310, so that the cartridge 200 can smoothly be loaded into the coder 400.

Figure 8:
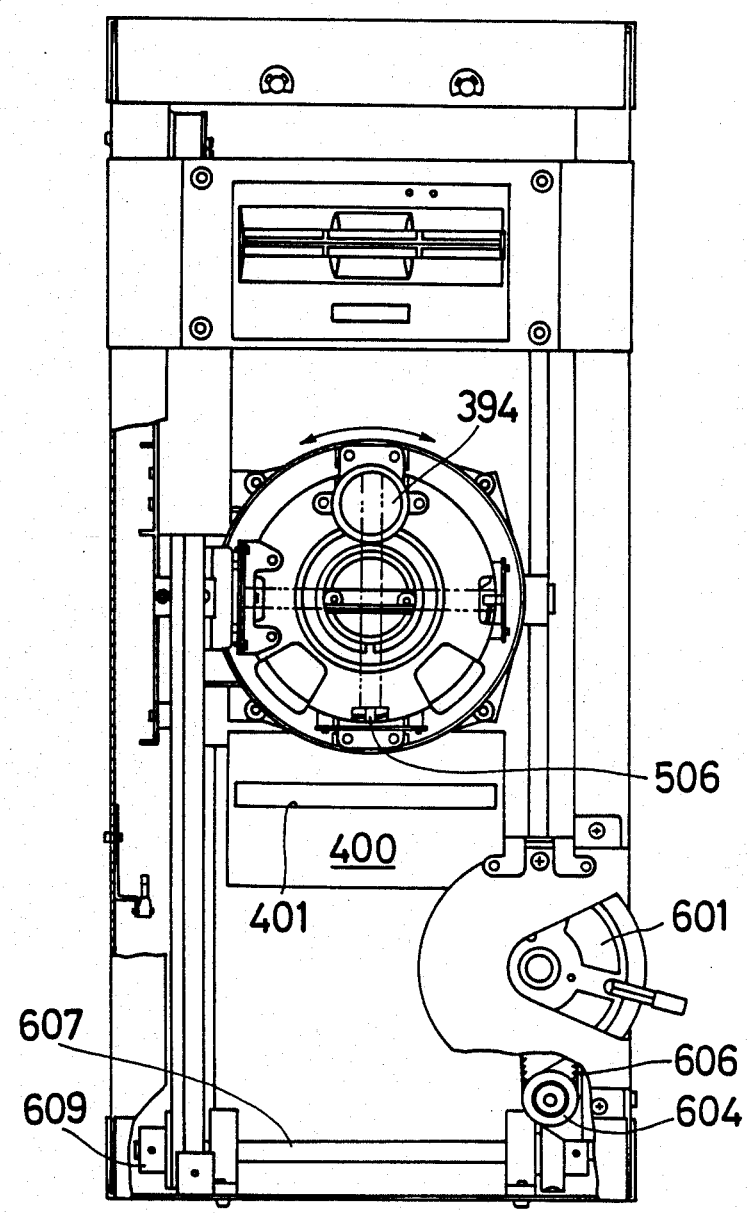
FIG. 8 shows the embodiment as viewed in the direction of the arrow C in FIG. 2.
Figure 9:
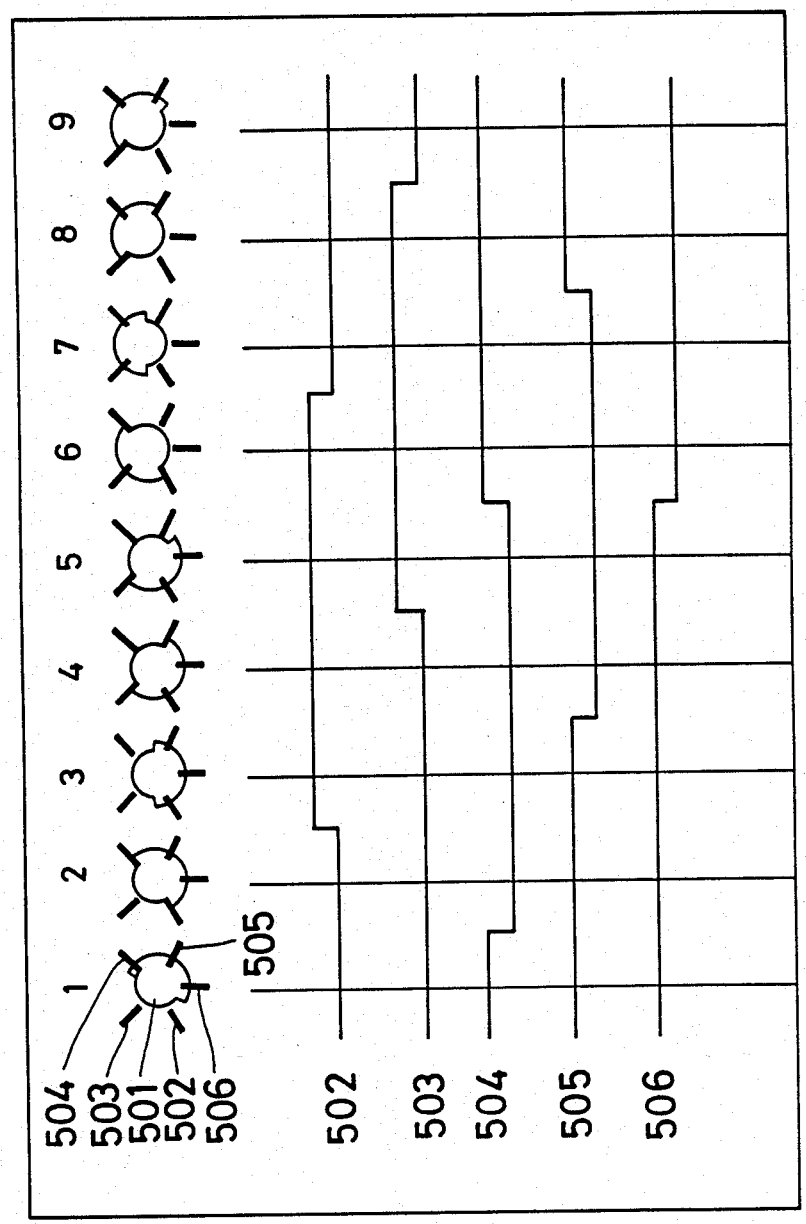
FIG. 9 shows the operation of a sensor employed in the embodiment.
Figure 10:
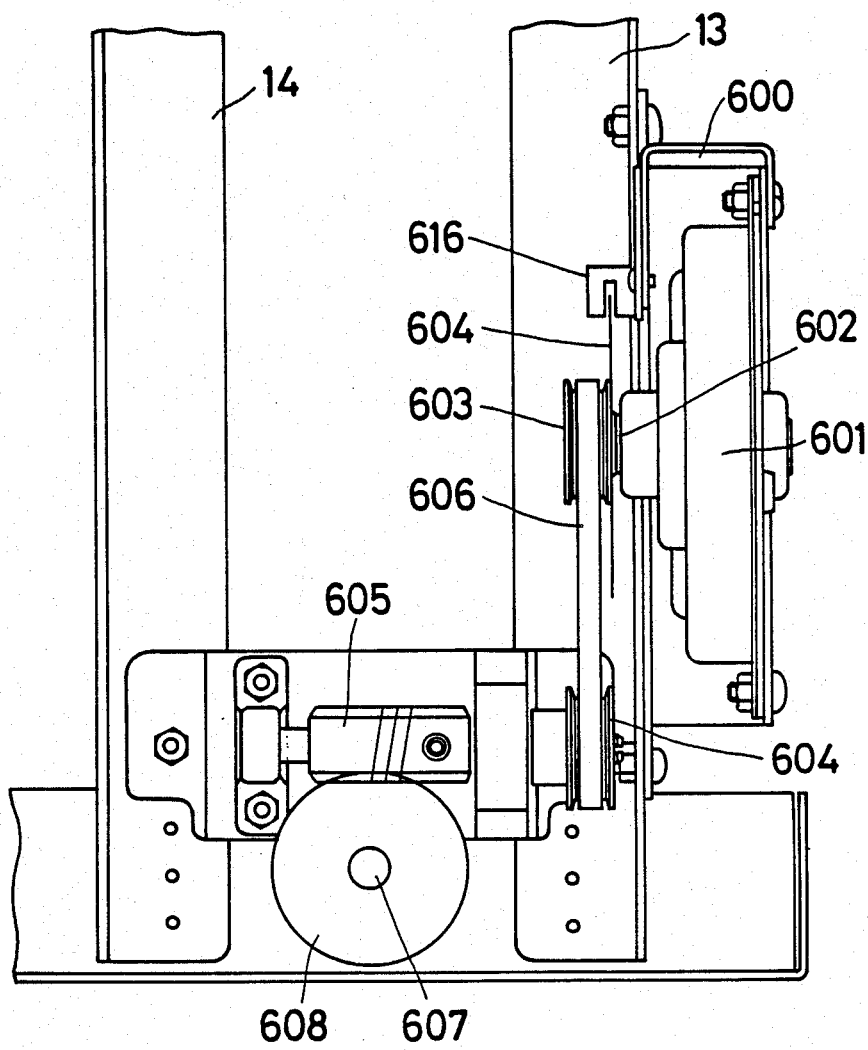
FIG. 10 shows a drive source for activating the carrier shown in FIG. 6 in its assembled state.

As shown in FIG. 6, a bearing 390 is interposed between the rear portion 312 of the casing 311 of the body portion 310 of the carrier 300 and the rear portion 332 of the casing 331 of the base portion 330, and a gear 393 is secured to the rear wall 333 of the casing 331 of the base portion 330. The gear 393 is meshed with a gear 396 secured to a shaft 395 of a motor 394 which is connected to the casing 311 of the body portion 310 in one unit. Thus, when the motor 394 is energized, the shaft 395 is rotated 180 degrees in either direction, thus causing the base portion 330 to be reversed. It is possible to reverse the direction of rotation of the base portion 330 by changing the polarities of current supplied to the motor 394. A sensor plate 501 is clamped between the gear 393 and the rear wall 333 of the casing 331 of the base portion 330 in such a manner that the sensor plate 501 has a predetermined positional relationship with photosensors 502, 503, 504, 505 (see FIG. 2) and 506 (see FIG. 8) to thereby control the rotation of the base portion 330. More specifically, the sensor plate 501 has a configuration such as that shown in FIG. 9, and when the sensor plate 501 reaches the state "3" or "7" shown in FIG. 9, the controller suspends the supply of current to the motor 394 to stop the rotation of the base portion 330.

As shown in FIGS. 1, 2, 8 and 10, a motor 601 is secured to a bracket 600 which is connected in one unit with a support 13 that connects together a base 11 and a top panel 12 of the disk file apparatus 10, and a gear 603 and a sensor plate 604 are secured to a shaft 602 of the motor 601. The gear 603 is connected through a toothed belt 606 with a gear 604 which rotates together with a gear 605, so that the rotation of the shaft 602 of the motor 601 is transmitted to the gear 605. A shaft 607 is rotatably supported on the base 11, and a gear 608 is secured to one end portion of the shaft 607, the gear 608 being orthogonally meshed with the gear 605, while a gear 609 is secured to the other end portion of the shaft 607. A toothed belt 611 is stretched between the gear 609 and a gear 619 which is rotatably supported by a bracket 610 secured to both the supports 13 and 14 so as to extend therebetween, the belt 611 being connected to both the body portion 310 of the carrier 300 and a balancer 613 which slides on the shaft 612. Thus, the rotation of the shaft 602 of the motor 601 is transmitted to the gear 609 through the gear 605 and the shaft 607, causing the body portion 310 of the carrier 300 to move vertically along the shafts 614 and 615. It should be noted that the direction of movement of the body portion 310 of the carrier 300 can be changed by switching over the polarities of current supplied to the motor 601. The amount of movement of the body portion 310 of the carrier 300 is limited in such a manner that the controller is activated to suspend the supply of current to the motor 601 when a photosensor 616 shown in FIG. 10 has counted a predetermined number of radial grooves (not shown) which are formed in a sensor plate 604.

Figure 11:
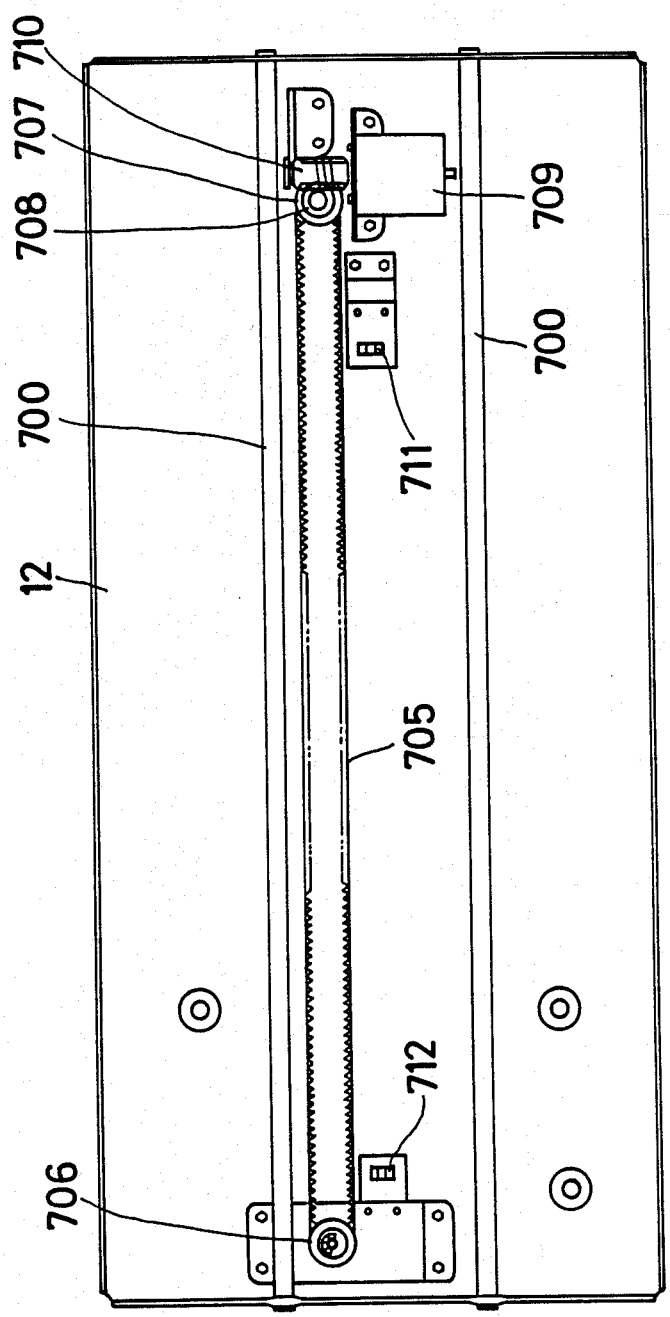
FIG. 11 shows a toothed belt for moving the transfer member in its assembled state.
Figure 12:
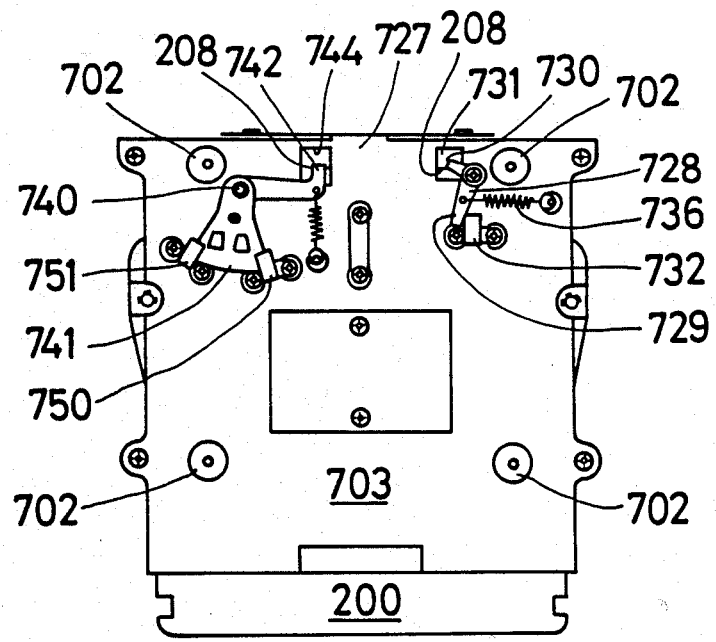
FIG. 12 is a plan view of the transfer member.
Figure 13:
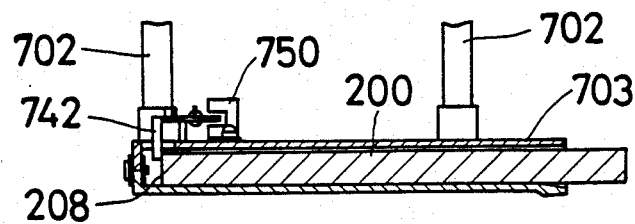
FIG. 13 is a sectional view showing a cartridge received in the transfer member.
Figure 14:
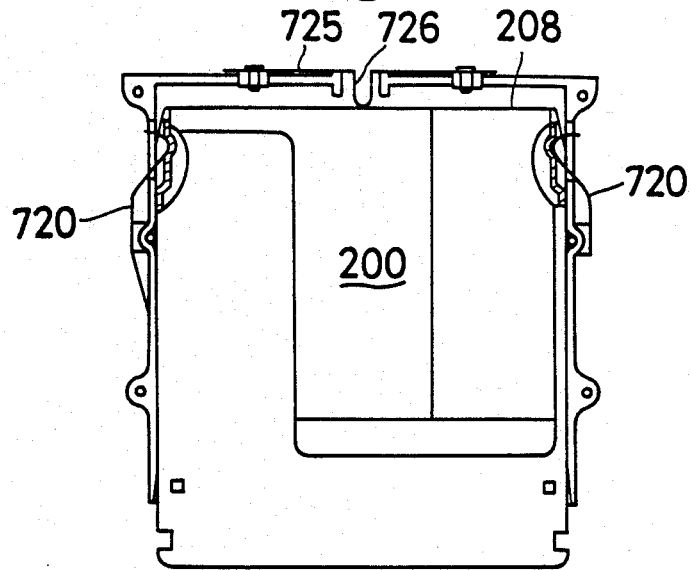
FIG. 14 is a plan view showing the transfer member in which a cartridge is received in such a manner that the side A of the disk accommodated therein faces downward.
Figure 15:
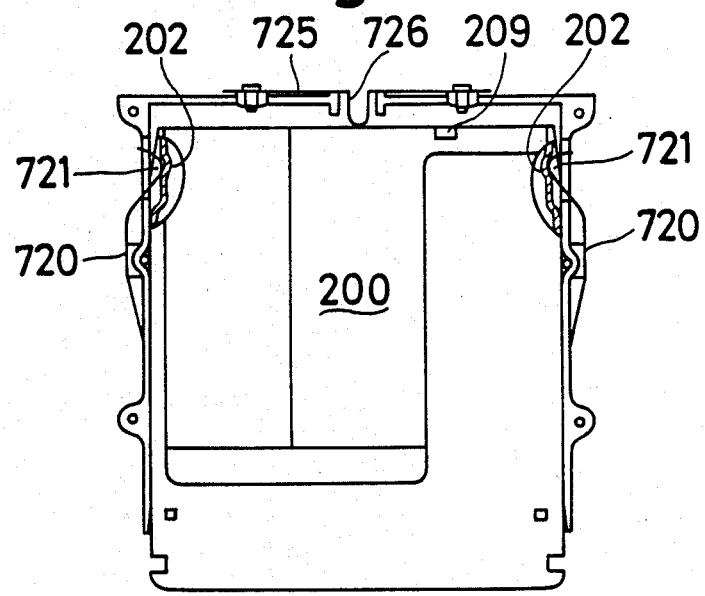
FIG. 15 is a plan view showing the transfer member in which a cartridge is received in such a manner that the side B of the disk accommodated therein faces downward.

As shown in FIGS. 3 and 11, a pair of parallel shafts 700 are provided on the undersurface of the top panel 12 of the disk file apparatus 10, and sliders 701 are slidably mounted on the shafts 700. A transfer member 703 for accommodating a cartridge 200 is secured to supports 702 which are suspended from the sliders 701, respectively. A toothed belt 705 is connected to a member 704 which is secured between the sliders 701, so that the member 704 moves together with the movement of the toothed belt 705 in one or the other direction. Referring specifically to FIG. 11, the toothed belt 705 is stretched between gears 706 and 707, and a gear 708 which is attached to the gear 707 so as to rotate together therewith in one unit is meshed with a gear 710 which is secured to a shaft (not shown) of a motor 709. Thus, it is possible to move the toothed belt 705 by energizing the motor 709, and the direction of movement of the belt 705 can be reversed by changing the polarities of current supplied to the motor 709. The amount of movement of the transfer member 703 which moves together with the toothed belt 705 in one unit is limited in such a manner that the controller is activated to suspend the supply of current to the motor 709 when a sensor plate (not shown) provided on the member 701 is detected by photosensors 711 and 712. As shown in FIGS. 12, 13 and 14, the recesses 202 in the cartridge 200 which is received in the transfer member 703 are resiliently engaged with R-shaped distal end portions 721 of springs 720, respectively, thereby enabling the cartridge 200 to be retained in the transfer member 703. Over-insertion of the cartridge 200 is prevented by means of a central round portion 726 of a spring 725. A lever 728 is pivotally supported on the upper surface 727 of the transfer member 703, and one end portion 729 of the lever 728 is constantly biased counterclockwise by means of a spring 736. The other end portion 730 of the lever 728 extends inside the transfer member 703 through a window 731 which is formed in the upper surface 727, and engages with the rear portion 208 of the cartridge 200. At this time, the first end portion 729 of the lever 728 is detected by means of a photosensor 732, and the controller judges from this state that the disk in the cartridge 200 has its side A facing downward. However, when the second end portion 730 of the lever 728 is fitted in a forward extending groove 209 which is formed in the rear portion 208 of the cartridge 200 (see FIG. 15), the first end portion 729 of the lever 728 is not detected by the photosensor 732, and it is judged that the side B of the disk faces downward. Further, a lever 740 is pivotally supported on the upper surface 727 of the transfer member 703. One end portion 741 of the lever 740 has a fan-shaped configuration, while the other end portion 742 of the lever 740 is constantly biased clockwise by means of a spring 743, so that the end portion 742 extends inside the transfer member 703 through a window 744 which is formed in the upper surface 727 and engages with the rear portion 208 of the cartridge 200. When the first end portion 741 of the lever 740 is detected by both photosensors 750 and 751, the controller judges that the cartridge 200 has correctly been received in the transfer member 703. If the cartridge 200 is not sufficiently received in the transfer member 703, the first end portion 741 of the lever 740 is detected by the photosensor 750 but not detected by the photosensor 751. In such a state, the controller does not permit the transfer member 703 to move toward the accommodating shelf 100. It should be noted that, before the cartridge 200 is inserted into the transfer member 703, the transfer member 703 is moved leftward as viewed in FIG. 3 to force shutters 761 open which are normally closed by means of the circumferential biasing force from springs 760, and the transfer member 703 stops at such a position that it substantially comes into contact with an opening portion 762. Normally, the shutters 761 act as means for preventing a cartridge from being inserted into the apparatus when the transfer member 703 is not positioned at the opening portion 762, and the shutters 761 also act as means for preventing intrusion of dust into the apparatus.

As has been described above, the disk file apparatus according to the present invention comprises the following constituent elements (1) to (6):

(1) an accommodating shelf having a multiplicity of accommodating spaces provided therein in a row in the vertical direction;

(2) a multiplicity of cartridges disposed in the accommodating spaces, respectively, each having a disk received therein and further having a forward extending groove formed in the rear portion thereof;

(3) a coder which writes or reads information in relation to either the side A or B of the disk received in each of the cartridges;

(4) a transfer member disposed at the upper side of the accommodating shelf, the transfer member having lever means which is arranged such that, when a cartridge having the same rating as that of said cartridges is inserted into the transfer member, the lever means detects whether or not there is a groove which is formed in the rear portion of the cartridge;

(5) a carrier arranged such as to move vertically along the respective front surfaces of the transfer member and the accommodating shelf, draw out a cartridge from the transfer member, insert the cartridge into an empty accommodating space in the accommodating shelf, draw out a designated one from the multiplicity of cartridges accommodated in the accommodating shelf, and load the cartridge into the coder; and (6) a controller arranged such that, when the lever means detects a groove formed in the rear portion of the cartridge inserted in the transfer member, the controller activates the carrier to turn the cartridge through 180 degrees while the cartridge is being moved from the transfer member to an empty accommodating space in the accommodating shelf, and when the downward side of the disk received in the selected cartridge is not coincident with the side which is to be subjected to writing or reading of information in the coder, the controller activates the carrier to turn the selected cartridge through 180 degrees before it is loaded into the coder.

By virtue of the above-described arrangement, when a new cartridge is inserted into the transfer member, whether the downward side is the side A or B is judged by the lever means, and if the side B faces downward, the carrier turns the cartridge concerned through 180 degrees before it is inserted into an empty accommodating space in the accommodating shelf. Accordingly, all the cartridges accommodated in the accommodating spaces have the disks facing downward at their sides A. Thus, the judgement as to which side of the disk in a selected cartridge faces downward need not be made between the selection of the cartridge and the loading of the selected cartridge into the coder, and therefore it is possible to shorten the access time. Further, since whether the downward side of the disk in the transfer member is the side A or B is checked by a mechanical means which utilizes fitting engagement between a recess and a projection rather than by a combination of a reflecting marker and reflection type sensors, there is no fear of malfunction due to separation of the reflecting marker or adhesion of dust to the marker.

Although the present invention has been described through specific terms, it should be noted here that the described embodiment is not necessarily limitative and various changes and modifications may be imparted thereto without departing from the scope of the invention which is limited solely by the appended claims.

What is claimed is:

1. A disk file apparatus comprising:
   (a) an accommodating shelf having a multiplicity of accommodating spaces provided therein in a row in the vertical direction;
   (b) a multiplicity of cartridges disposed in said accommodating spaces, respectively, each having a disk received therein and further having a forward extending groove formed in the rear portion thereof;
   (c) a coder which writes or reads information in relation to either a side A or B of the disk received in each of said cartridges;
   (d) a transfer member disposed at the upper side of said accommodating shelf, said transfer member having lever means which is arranged such that, when a cartridge having the same dimensions as that of other cartridges is inserted into said transfer member, said lever means detects whether or not there is a groove which is formed in the rear portion of said cartridge;
   (e) a carrier arranged such as to move vertically along the respective front surfaces of said transfer member and said accommodating shelf, draw out a cartridge from said transfer member, insert said cartridge into an empty accommodating space in said accommodating shelf, draw out a designated one from the multiplicity of cartridges accommodated in said accommodating shelf, and load said cartridge into said coder; and
   (f) a controller arranged such that, when said lever means detects the groove formed in the rear portion of the cartridge inserted in said transfer member, said controller activates said carrier to turn said cartridge through 180 degrees while said cartridge is being moved from said transfer member to an empty accommodating space in said accommodating shelf, and when the downward side of the disk received in the selected cartridge is not coincident with the side which is to be subjected to writing or reading of information in said coder, said controller activates said carrier to turn said selected cartridge through 180 degrees before it is loaded into said coder.

2. A disk file apparatus according to claim 1, wherein said lever means includes: a lever having first and second end portions and pivotally supported on the upper surface of said transfer member, said second end portion extending inside said transfer member through a window formed in the upper surface of said transfer member; a spring for biasing said lever in one direction; and a photosensor which detects the first end portion of said lever when said lever is pivoted against the biasing force from said spring as a result of the engagement between the second end portion of said lever and the rear portion of the cartridge inserted into said transfer member.

* * * * *